United States Patent [19]

Nagel

[11] Patent Number: 4,608,629
[45] Date of Patent: Aug. 26, 1986

[54] MULTIPROCESSOR MEMORY SYSTEM EMPLOYING DATA TRANSFER SYSTEM

[75] Inventor: Klaus Nagel, Munich, Fed. Rep. of Germany

[73] Assignee: Siemens Aktiengesellschaft, Berlin & Munich, Fed. Rep. of Germany

[21] Appl. No.: 629,757

[22] Filed: Jul. 13, 1984

Related U.S. Application Data

[63] Continuation of Ser. No. 61,272, Jul. 27, 1979, abandoned.

[30] Foreign Application Priority Data

Sep. 28, 1978 [DE] Fed. Rep. of Germany ....... 2842288

[51] Int. Cl.⁴ .............................................. G06F 9/36
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,723,976 | 3/1973 | Alvarez et al. | 364/200 |
| 3,761,881 | 9/1973 | Anderson et al. | 364/200 |
| 3,764,996 | 10/1973 | Ross | 364/200 |
| 3,938,100 | 2/1976 | Steiner | 364/200 |
| 4,079,453 | 3/1978 | Dahl | 364/200 |
| 4,084,227 | 4/1978 | Bennett et al. | 364/200 |
| 4,084,230 | 4/1978 | Matick | 364/200 |
| 4,183,086 | 1/1980 | Kober | 364/200 |

*Primary Examiner*—Eddie P. Chan
*Attorney, Agent, or Firm*—Hill, Van Santen, Steadman & Simpson

[57] ABSTRACT

A multiprocessor system incorporating a plurality of processors, each with its own memory unit, has a data transfer switch incorporating an associative memory for selectively converting memory addresses between virtual addresses and real addresses. The associative memory is used to select a memory part which is individual to each processor, and complete random memory addresses are constructed partly from the output of the associative memory and partly from local addresses provided on an address bus.

6 Claims, 4 Drawing Figures

MULTIPROCESSOR MEMORY SYSTEM EMPLOYING DATA TRANSFER SYSTEM

This is a continuation, of application Ser. No. 061,272, filed 7/27/79, now abandoned.

FIELD OF THE INVENTION

The present invention relates to a multiprocessor memory system, and more particularly to such a system employing a data transfer switch incorporating a virtual memory feature with associative address selection.

THE PRIOR ART

It is conventional in multiprocessor systems to provide data exchange procedures between the individual processors. There are two general problems involved in these procedures, the significance of which increases with the number of processors and the complexity of the problem or problems being handled by the multiprocessor system. In the first place, the data exchange must proceed quickly, in order to maximize the through-put of the system. Secondly, it is desirable to maintain the cost of the data transfer system as small as possible in order to maintain good efficiency, without compromising the access by each individual process to data needed by it, and without interfering with surveillance of the total system which is needed to insure integrity of results.

In a multiprocessor system described in the German OS No. 2,546,202, each of a plurality of processors is provided with an individual couple memory and the results of calculations by each processor are distributed, by means of a central control computer, from a selected couple memory to all of the other couple memories. This procedure is repeated for results calculated by all of the processors, and it is apparent therefore that all of the couple memories have the same data structures. Each couple memory thus contains all of the calculation results, even when the individual processors require only some of the results.

From the German OS No. 2,703,559, a data communication procedure is known which decreases the quantity of memory required for the communication procedures. A virtual memory is employed, with only memory parts which are needed by the processors for data being realized physically. Real addresses are coordinated with the virtual addresses by way of associative memories. A relatively large associative memory is required, however, and it is desirable to reduce the size of the required associative memory.

SUMMARY OF THE INVENTION

It is a principal object of the present invention to provide a memory system for a multiprocessor system which incorporates a reduced requirement for associative memories.

Another object of the present invention is to provide a memory system for a multiprocessor system employing an improved addressing mechanism.

In one embodiment of the present invention, there is provided a data transfer switch having a virtual memory with associative address selection, in which the virtual memory is organized in a plurality of equal parts, and with the memory addresses composed of a part address and a local address, such parts being selected by means of individual part addresses associated with them, memory locations within the several parts being selectable by means of local addresses, the associative memory producing the part addresses from corresponding address parts of real addresses.

By use of the present invention, only that portion of the real address which concerns the memory part makes use of the associative memory, so that a reduced capacity of associative memory is required. In particular, the associative memory must have only as many inputs as are necessary for addressing the parts used by a given module or processor.

Other objects and advantages of the present invention will become manifest by an inspection of the following description and the accompanying drawings.

BRIEF DESCRIPTION OF THE DRAWINGS

Reference will now be made to the accompanying drawings in which.

DESCRIPTION OF THE PREFERRED EMBODIMENTS

Figure 1:
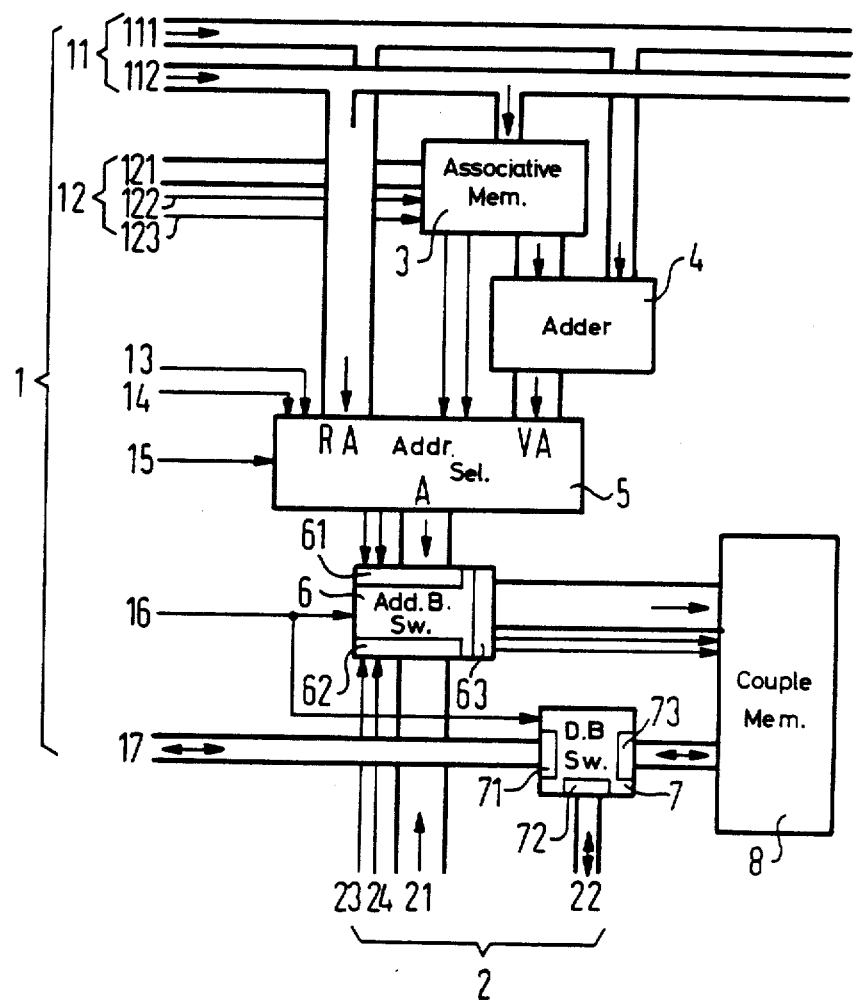
FIG. 1 is a functional block diagram of an illustrative embodiment of the present invention incorporating an adder for developing a total address.

Referring now to FIG. 1, an illustrative embodiment of the present invention is illustrated, in which a real address is associated with a virtual address in a given system module. For a system module M, the real address is $F_M(SA)+LA$, where the function $F_M$ is determined individually in each module by means of an associative memory 3, which can be loaded by a control computer arranged centrally in the system. The processors, and the control computer, are interconnected in the system by means of a system bus 1, which includes an address bus 11 and a data bus 17. The system bus 1 also incorporates a bus 12 having parts 121, 122 and 123, which is adapted to load data into the associative memory 3, in accordance with the function $F_M$ for each individual processor. The apparatus of FIG. 1 is connected to an individual processor by means of a processor bus 2.

The system address bus 11 is divided into two sub buses 111 and 112, which manifest respectively local addresses and memory part addresses. The memory part addresses are inputs to the associative memory 3, and the associative memory 3 produces an output which is connected as an input to an adder unit 4. Another input of the adder unit 4 is connected from the local address sub bus 111. The output of the adder 4 is connected as an input to an addressing selector 5, which addresses a couple memory 8 through an address bus selection switch 6. The address bus selection switch 6 selects between addresses supplied from the addressing selector 5 by way of a system address bus interface 61, or an address bus 21 forming a part of the processor bus 2, which is connected to the address bus selecting switch 6 by way of a processor address bus interface 62. One of the two address buses is selected, by operation of a bus selecting control line 16, and the selected address bus is connected to the couple memory 8.

The addressing selector 5 receives a real address directly from both parts of the system address bus 11, as well as the total (virtual) address from the adder 4. Either the real or virtual address can be selected by means of an address selecting control line 15, which is part of the system bus 1. The system bus also incorporates control lines 13 and 14 which respectively perform the functions of memory selection, and read-write control.

A data bus selecting switch 7 is provided, which connects the processor data bus 22, via an interface 72, with either the system data bus 17 or the couple memory 8, via interfaces 71 and 73, respectively.

In addition to the memory part address output supplied by the associative memory 3 to the adder 4, the associative memory produces two additional signals, which are supplied to the addressing selector 5. These are signals $T_M$ and $RW_M$. The $T_M$ signal indicates whether or not a desired address is present in the associative memory, and $RW_M$ is a read-write flag for controlling the read or write operation of the couple memory 8. In the system of FIG. 1, the same number of memory parts is devoted to each module. In the simplest case, the number of parts is equal to the number of modules, with one part associated with each module. Where a plurality of memory parts is provided for each module, a number of lines are provided as outputs from the associative memory 3 to the adder 4, so that a particular memory part can be designated by a combination of signals on these lines.

The associative memory 3 may be replaced if desired by a cheaper, directly addressable memory, containing one word for each memory part of the virtual memory. This may be a conventional read-write memory, or RAM, if the identity of the memory parts associated with an individual module is to be alterable. A read only memory, or ROM, may be employed if no alteration is desired in the identity of the memory parts associated with individual modules or processors.

In operation, the associative memory 3 delivers to the addressing selector 5 the full random starting address for each memory part associated with the given module. The adder 4 adds the local address derived from the bus 111 to the output of the associative memory 3 to provide a total address. The addition preferably takes place in parallel so that no substantial delay is introduced by the adder 4. The size of a particular memory part is determined by the size of the local address supplied from the bus 111.

Figure 2:
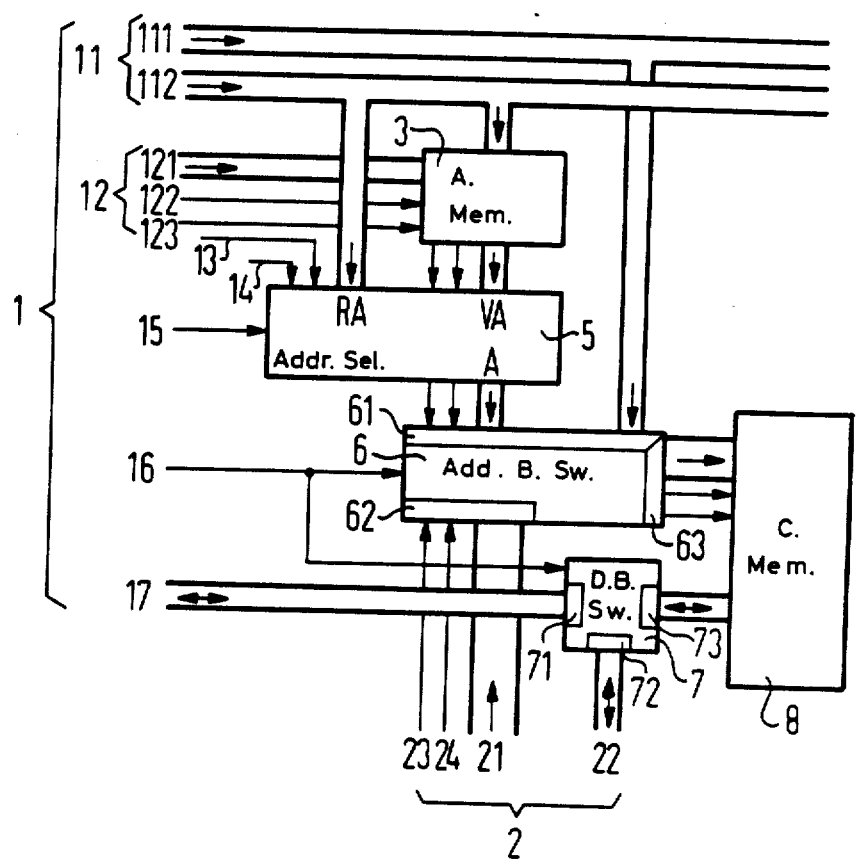
FIG. 2 is a functional block diagram of an alternative embodiment of the present invention in which the local address part of the real address is supplied directly from an address bus.

In the embodiment illustrated in FIG. 2, the associative memory 3 delivers the memory part address directly to the addressing selector 5, and the local address is supplied directly to the address bus selecting switch 6. As the local address is not passed through an adder, it is unchanged, and is used both during virtual addressing and real addressing, as determined by the control line 15. The arrangement of FIG. 2 is simpler than that of FIG. 1, but is inherently limited by the fact that the size of the memory part identified by the associative memory 3 must conform to a power of 2. The use of the adder 4 in the embodiment of FIG. 1 avoids this limitation.

Figure 3:
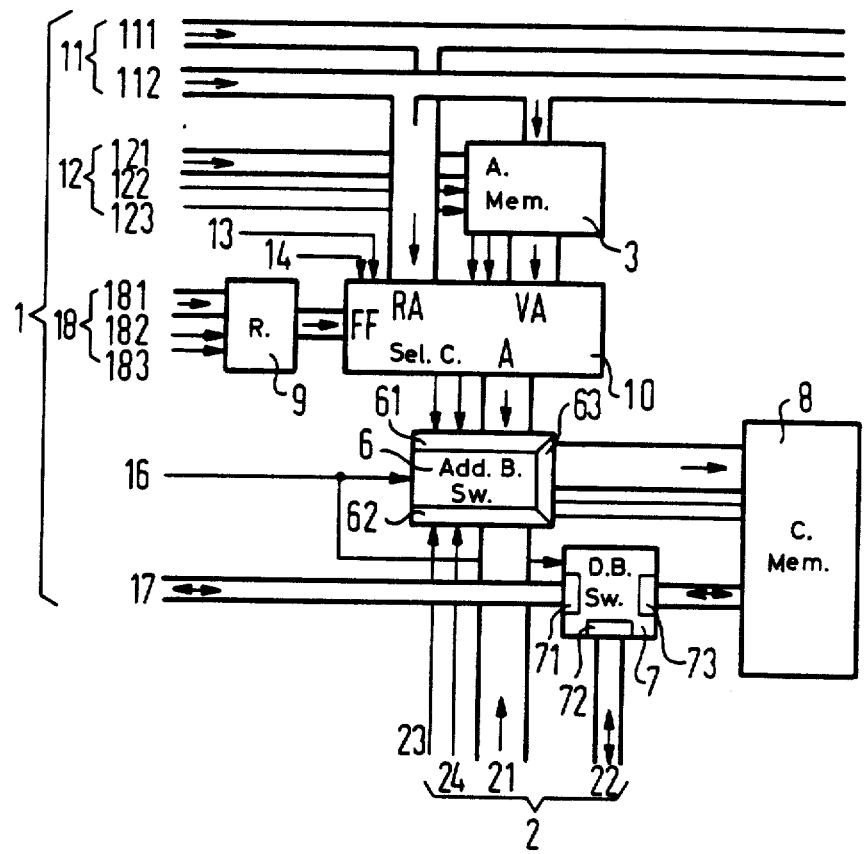
FIG. 3 is a functional block diagram of another embodiment of the present invention incorporating a register for determining, for each bit of the real address, whether such bit is derived from the address bus or the associative memory.

In the embodiment illustrated in FIG. 3, the associative memory 3 provides an output which is connected as a virtual address input to a selection control unit 10. A real address input is connected directly from the address bus 11. The selection control unit 10 produces an address which is supplied to the address bus selecting switch 6 by way of interface 61, just as described above.

The operation of the selection control unit 10 is controlled by a register 9, through a plurality of control inputs FF.

The associative memory 3 delivers a full starting address for each memory part. The register 9 functions to control the selection control unit 10 to select, for each bit of the address output, the corresponding bit from either the real or virtual address inputs. By operation of the register 9, selection can be made between real and virtual memory part addressing and also the memory part size can be changed in powers of 2. The register 9 is set by data and control signals on a bus 18 incorporating a data bus 181, and control lines 182 and 183. The register has a number of stages, one for each bit of the address which is to be supplied to the couple memory 8. Each bit $A_i$ of such address is determined by the function:

$$A_i = (RA_i \cdot FF_i) + (VA_i \cdot \overline{FF_i}),$$

where $A_i$ is the i-th bit of the address supplied to the couple memory 8, or $A_i$ is the i-th bit of the real address word, $VA_i$ is the i-th bit of the virtual address word, and $FF_i$ is the i-th bit of the word stored in the register 9.

Figure 4:
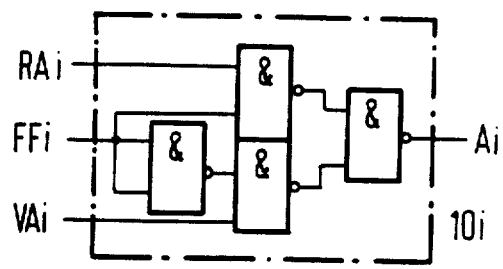
FIG. 4 is a functional block diagram of a portion of the apparatus of FIG. 3.

FIG. 4 illustrates how this function is calculated for each bit of the address word, by means of NAND-gates, one of which is connected as an inverter to derive the signal $\overline{FF_i}$.

It will be appreciated that when all of the bits of the register 9 are zeros, virtual addressing is selected, and when all of the bits are ones, real addressing is selected. When the high order bits of the register 9 are zeros and the low order bits are ones, the low order portion of the address supplied to the coupling memory 8 is selected directly from the bus 11, while the higher order bits are the virtual address output of the associative memory 3, duplicating the operation of the apparatus of FIG. 2.

From the foregoing, it will be appreciated that the apparatus of the present invention is adapted to provide a memory system with great flexibility in a multiprocessor system, while conserving the quantity of the equipment required. The present invention is advantageously used in multiprocessor systems where problems are processed parallelly, as for example, the solution of systems of partial differential equations. Such systems are typically used in weather prognosis, potential fuel calculations, process controls and simulation programs.

It is apparent that various modifications and additions may be made in the apparatus of the present invention without departing from the essential features of novelty thereof, which are intended to be defined and secured by the appended claims.

What is claimed is:

1. A memory system employing an address bus carrying real address words (RAW), said address bus consisting of two subbuses, a first said sub-bus carrying a real memory part address (RPA) and a second said sub-base carrying a real local address (RLA); a memory having a plurality of memory parts of the same memory size, said memory parts being addressed by said real memory part addresses (RPA) and locations within each of such parts being addressed by said real local addresses (RLA); assembly means connected to said address bus for assembling addresses and connected to said memory for accessing said memory locations, said assembly means comprising an address selector and an address bus selection switch, an associative memory connected to said first said sub-bus and adapted to store a plurality of memory part addresses (PA), and to present said stored memory part addresses (PA) to an output of said associative memory; said address selector having a first input connected to said first sub-bus and a second input connected to the output of said associative memory, said address selector being adapted to supply either of said first and second inputs to its output, said address bus selector switch for selecting between addresses supplied from the address selector or from a processor bus and having a first input connected to the output of said address selector, and a second input connected to said second sub-bus, and an output connected to the address inputs of said memory; said address selector being connected to a control signal and responsive thereto for selecting either its said first or its second input for connection to said address bus switch; and said address selector being connected to said control signal and responsive thereto for supplying to said address bus switch either of its first and second inputs, whereby said memory is accessed either with said real address word (RAW) from said first and second sub-buses of said address bus or with an address word made up of the memory part addresses (PA) produced by said associative memory and said real local address (RLA) from said second sub-bus of said address bus.

2. Apparatus according to claim 1, wherein said associative memory comprises a RAM.

3. Apparatus according to claim 1, wherein said associative memory comprises a ROM.

4. Apparatus according to claim 1, wherein the assembly means is connected to said associative memory to receive a memory part address (PA) from said associative memory for use as the high order bits of said access address, and connected to said address bus to receive the local address for use as the lower order bits of said access address.

5. Apparatus according to claim 1, wherein said assembly means comprises a control register, input means for presetting said control register, said address selector being connected to said control register and responsive to the content of said control register for selectively producing said access address corresponding to said real address or to said address word incorporating the memory part address produced by said associative memory.

6. Apparatus according to claim 5, wherein said address selector includes means for producing individual bits of said access address in accordance with the function $A_i = (RA_i.FF_i) + (VA_i.\overline{FF_i})$, where i identifies an individual bit of the output address, RA is an address bit of said real memory part address produced on said address bus, VA is an address bit produced by said associative memory, and FF is one of the plurality of bits stored in said control register.

* * * * *